(12) United States Patent
Joshi et al.

(10) Patent No.: US 8,489,622 B2
(45) Date of Patent: Jul. 16, 2013

(54) COMPUTER-IMPLEMENTED SYSTEMS AND METHODS FOR PROVIDING PAGINATED SEARCH RESULTS FROM A DATABASE

(75) Inventors: Mahesh V. Joshi, Cary, NC (US); Michael J. Leonard, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1003 days.

(21) Appl. No.: 12/333,709

(22) Filed: Dec. 12, 2008

(65) Prior Publication Data
US 2010/0153409 A1    Jun. 17, 2010

(51) Int. Cl.
*G06F 7/00* (2006.01)
*G06F 17/30* (2006.01)

(52) U.S. Cl.
USPC .......................................... 707/754; 707/759

(58) Field of Classification Search
USPC ..................... 707/2, 3, 754, 759; 702/189
See application file for complete search history.

(56) References Cited

U.S. PATENT DOCUMENTS 6,609,085 B1 * 8/2003 Uemura et al. ............... 702/189
6,748,374 B1 * 6/2004 Madan et al. ..................... 707/2
7,624,114 B2 * 11/2009 Paulus et al. ...................... 707/1
7,941,413 B2 * 5/2011 Kashiyama et al. .......... 707/696
2010/0121868 A1 * 5/2010 Biannic et al. ................ 707/759

OTHER PUBLICATIONS

Agarwal, Deepak et al., "Efficient and Effective Explanation of Change in Hierarchical Summaries", The 13th International Conference on Knowledge Discovery and Data Mining 2007, Aug. 12-15, 2007 (10 pp.).
Hyndman, Rob J. et al., "Optimal combination forecasts for hierarchical time series", Monash University, Department of Econometrics and Business Statistics, http://www.buseco.monash.edu.au/depts/ebs/pubs/wpapers/ (23 pp.).

* cited by examiner

*Primary Examiner* — Apu Mofiz
*Assistant Examiner* — Chelcie Daye
(74) *Attorney, Agent, or Firm* — Kilpatrick Townsend & Stockton LLP

(57) ABSTRACT

Computer-implemented systems and methods provide paginated search results from a multi-table database that stores hierarchically arranged data nodes. A query request is received that identifies one or more constraints and one or more monitoring attributes. Records of the multi-table database are filtered to create a view containing only records which meet the constraints. Monitoring attributes associated with a first n records of the view are accessed to generate an output view, where n is the number of records that may be displayed on a single page, and the output view is displayed on a user-viewable medium.

39 Claims, 16 Drawing Sheets

Fig. 9

Mprop AT ROOT LEVEL — 222 (228)

| Id | Mprop1 | Mprop2 | Mprop3 |
|---|---|---|---|
| R | 0.3 | A | 50 |

Sprop AT ROOT LEVEL — 224 (228)

| Id | Sprop1 | Sprop2 |
|---|---|---|
| R | 1.0 | 20 |

Fprop AT ROOT LEVEL — 226 (228)

| Id | Fprop1 | Fprop2 | Fprop3 | Fprop4 |
|---|---|---|---|---|
| R | 10 | W | 12 | 2.5 |

Mprop AT LEVEL 1 — 232 (238)

| Id | Mprop1 | Mprop2 | Mprop3 |
|---|---|---|---|
| N1 | 0.3 | B | 10 |
| N2 | 0.5 | A | 20 |

Sprop AT LEVEL 1 — 234 (238)

| Id | Sprop1 | Sprop2 |
|---|---|---|
| N1 | 0.3 | B |
| N2 | 0.8 | A |

Fprop AT LEVEL 1 — 236 (238)

| Id | Fprop1 | Fprop2 | Fprop3 | Fprop4 |
|---|---|---|---|---|
| N1 | 0.3 | W | 10 | 2.8 |
| N2 | 0.5 | Z | 35 | 1.9 |

230

VIEW AT ROOT LEVEL:

| Id | S prop 1 | F prop 4 |
|---|---|---|
| R | 1.0 | 2.5 |

VIEW AT ROOT LEVEL 1:

| Id | S prop 1 | F prop 4 |
|---|---|---|
| N2 | 0.8 | 1.9 |

VIEW AT LEVEL 2:

| Id | S prop 1 | F prop 4 |
|---|---|---|
| N4 | 0.5 | 1.9 |
| N5 | 1.0 | 1.3 |

Fig. 12

PRE-SORT TABLE AT ROOT LEVEL:

| Id | S prop 1 | F prop 4 | F prop 3 |
|---|---|---|---|
| R | 1.0 | 2.5 | 12 |

PRE-SORT TABLE AT LEVEL 1:

| Id | S prop 1 | F prop 4 | F prop 3 |
|---|---|---|---|
| N2 | 0.8 | 1.9 | 35 |

PRE-SORT TABLE AT LEVEL 2:

| Id | S prop 1 | F prop 4 | F prop 3 |
|---|---|---|---|
| N4 | 0.5 | 1.9 | 20 |
| N5 | 1.0 | 1.3 | 70 |

Fig. 13

ORDERED DATASET FOR OPTION 1:

| Id | _level_ | S prop 1 | F prop 4 | F prop 3 |
|----|---------|----------|----------|----------|
| N5 | 2 | 1.0 | 1.3 | 70 |
| N2 | 1 | 0.8 | 1.9 | 35 |
| N4 | 2 | 0.5 | 1.9 | 20 |
| R  | 0 | 1.0 | 2.5 | 12 |

Fig. 14A

ORDERED DATASET FOR OPTION 2:

| Id | _level_ |
|----|---------|
| N5 | 2 |
| N2 | 1 |
| N4 | 2 |
| R  | 0 |

PORTION OF ORDERED DATA SET FOR PAGE 2:

| Id | _level_ | _order_ |
|----|---------|---------|
| N4 | 2 | 1 |
| R | 0 | 2 |

*Fig. 15A*

PORTION OF PAGE 2 FOR ROOT LEVEL:

| Id | _level_ | _order_ |
|----|---------|---------|
| R | 0 | 2 |

PORTION OF PAGE 2 FOR LEVEL 2:

| Id | _level_ | _order_ |
|----|---------|---------|
| N4 | 2 | 1 |

PORTION OF PAGE 2 FOR ROOT LEVEL
WITH MONITORING ATTRIBUTES:    ⎯322

| Id | _level_ | _order_ | F prop3 | M prop2 |
|----|---------|---------|---------|---------|
| R  | 0       | 2       | 12      | A       |

PORTION OF PAGE 2 FOR LEVEL 2
WITH MONITORING ATTRIBUTES:    ⎯324

| Id | _level_ | _order_ | F prop3 | M prop2 |
|----|---------|---------|---------|---------|
| N4 | 2       | 1       | 20      | D       |

*Fig. 16A*

PORTION OF ORDERED DATA SET FOR PAGE 2
WITH MONITORING ATTRIBUTES:    ⎯326

| Id | _order_ | F prop3 | M prop2 |
|----|---------|---------|---------|
| R  | 2       | 12      | A       |
| N4 | 1       | 20      | D       |

*Fig. 16B*

OUTPUT VIEW    ⎯330

| Id | F prop3 | M prop2 |
|----|---------|---------|
| N4 | 20      | D       |
| R  | 12      | A       |

*Fig. 17*

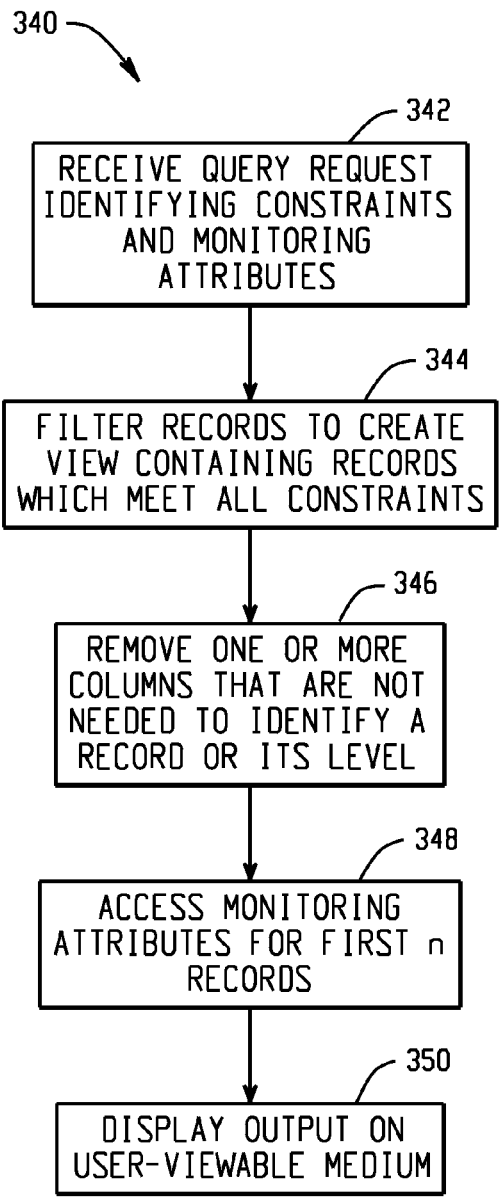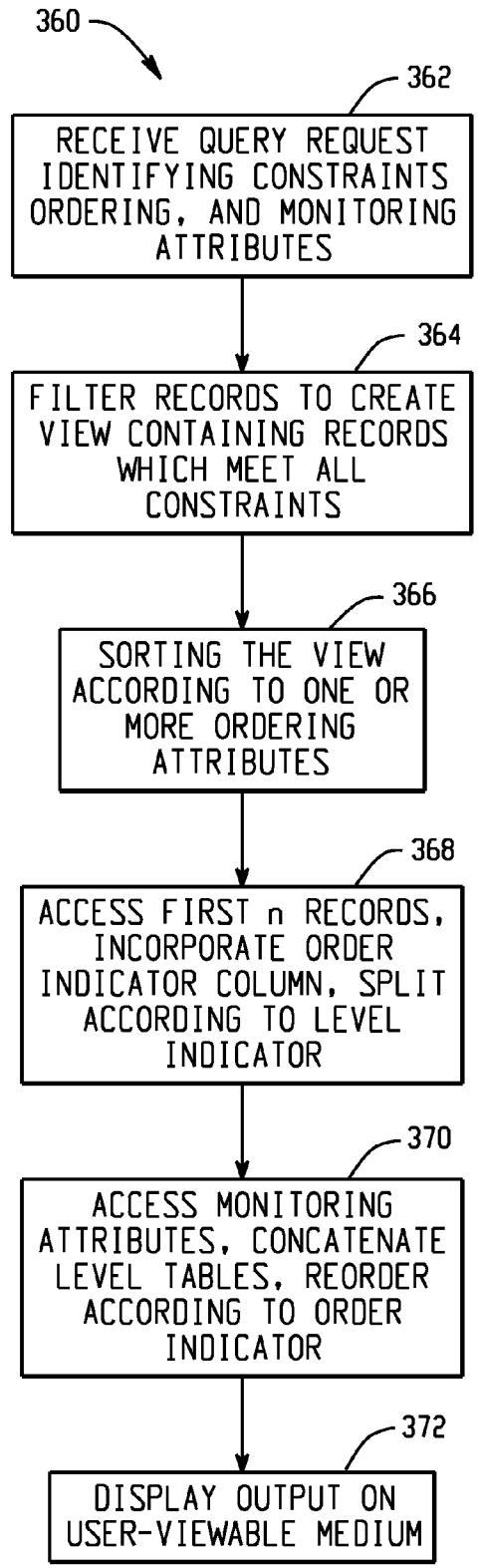
Fig. 18
Fig. 19

COMPUTER-IMPLEMENTED SYSTEMS AND METHODS FOR PROVIDING PAGINATED SEARCH RESULTS FROM A DATABASE

TECHNICAL FIELD

This document relates generally to database processing and more specifically to providing paginated search results from one or more databases containing hierarchically arranged data.

BACKGROUND

The ability to quickly and easily assemble hierarchically-arranged data and make calculations based upon such data (e.g., make predictions of future events) offers benefits in a wide variety of fields including medical research, strategic business planning, public transportation engineering, and many others. A number of data applications naturally lend themselves to hierarchical organization. For example, a geography may be hierarchically broken down from continent to country to state to city. As another example, a corporation may be hierarchically viewed from an entire company level, which contains a country level, which breaks down into members of a region level. The region level may then further decompose into additional levels.

FIG. 1 illustrates an example structure 30 for storing hierarchical data. A single root node 32 makes up the root level 34. The root node 32 contains two level 1 nodes 36, 38 that are related to the root node 32 by parent-child relationships 40, 42. Similarly, each of the level 1 nodes 36, 38 contains a plurality of level 2 child nodes 44. The number of levels and child nodes contained within a given parent node may vary to meet the needs of a given data application.

SUMMARY

In accordance with the teachings provided herein, computer-implemented systems and methods are disclosed herein for providing paginated search results from a multi-table database that stores hierarchically arranged data nodes. As an example, a system and method can be configured such that a query request is received that identifies one or more constraints and one or more monitoring attributes. Records of the multi-table database are filtered to create a view containing only records which meet the constraints. One or more columns may be removed from the view that are not needed to identify a record or a level on which a record resides in the hierarchically arranged multi-table database to generate a condensed view.

As another example, a system and method are configured to provide paginated search results from a multi-table database that stores hierarchically arranged data nodes, where a time series is associated with each node, where a statistical model is associated with each time series, wherein one or more attributes of each statistical model are stored in the multi-model database. A query may be received that identifies one or more constraints and one or more monitoring attributes, where a constraint includes a filtering attribute and a criteria that the filtering attribute must meet for a record to be included in the search results, where the filtering attribute is a stored attribute of a statistical model or a time series. The records of the multi-table database may be filtered to create a view containing only records which meet all of the constraints. One or more columns may be removed from the view that are not needed to identify a record or a level on which a record resides in the hierarchically arranged multi-table database to generate a condensed view. Monitoring attributes associated with a first n records of the condensed view may be accessed to generate an output view, where n is the number of records that may be displayed on a single page. The output view may be displayed on a user-viewable medium.

As an additional example, a computer-implemented system and method for providing paginated search results from a hierarchically arranged multi-table database may receive a query request that identifies one or more constraints, one or more ordering attributes, and one or more monitoring attributes, where a constraint includes a filtering attribute and a criteria that the filtering attribute must meet for a record to be included in the search results. Records of the multi-table database may be filtered to create a view containing only records which meet all of the constraints. The view may be sorted according to one or more of the ordering attributes, and a level indicator column may be incorporated into the view for each record in the view, where the level indicator column identifies a level on which each record in the hierarchically arranged multi-table database resides. All columns from the view may be removed except a record identifying column and the level indicator column to generate a condensed view. The condensed view may be stored in non-volatile memory. A request may be received to generate and view an output view based on the stored condensed view. An order indicator column may be incorporated into the view for each record in the view to identify the order in which each record appears based on the sorting step. The condensed view may be split according to level indicator column values to form level tables, where one level table is associated with each level in the hierarchically arranged multi-table database, and monitoring attributes associated with a first n records of the level tables according to the order indicator column may be accessed to generate an output view. The output view may be displayed on a computer-viewable medium.

As a further example, a computer-implemented system for providing paginated search results from a multi-table database that stores hierarchically arranged data nodes may include a records filter configured to receive a query that identifies one or more constraints and one or more monitoring attributes that creates a view containing only records which meet all of the constraints. The system may further include a filter optimizer configured to remove one or more columns from the view that are not needed to identify a record or a level on which a level resides in the hierarchically arranged multi-table database to generate a condensed view. The system may further include a monitoring attribute retriever configured to access monitoring attributes associated with a first n records of the condensed view to generate an output view. The system may also include a user-viewable display for displaying the output view.

BRIEF DESCRIPTION OF THE DRAWINGS

FIG. 9 depicts attributes of a root level node and the time series and data model associated with the root level node.

FIG. 10 depicts attributes of level 1 nodes and the time series and data model associated with the level 1 nodes.

FIG. 12 depicts filtered views at each of the levels.

FIG. 13 depicts filtered views at each of the levels with an ordering attribute incorporated.

FIGS. 14A and 14B depict example ordered data sets.

FIGS. 15A and 15B depict an ordered data set for a single page of results and an ordered data set for a single page of results split according to level, respectively.

FIGS. 16A and 16B depict a split ordered data set for a single page of results with monitoring attributes incorporated, and a recombined ordered data set for a single page of results with monitoring attributes incorporated, respectively.

FIG. 17 depicts an output view.

FIG. 18 is a flow diagram depicting a method of providing paginated search results from a multi-table database that stores hierarchically arranged data.

FIG. 19 is a flow diagram depicting a method of providing paginated, ordered search results from a multi-table database that stores hierarchically arranged data.

DETAILED DESCRIPTION

Figure 1:
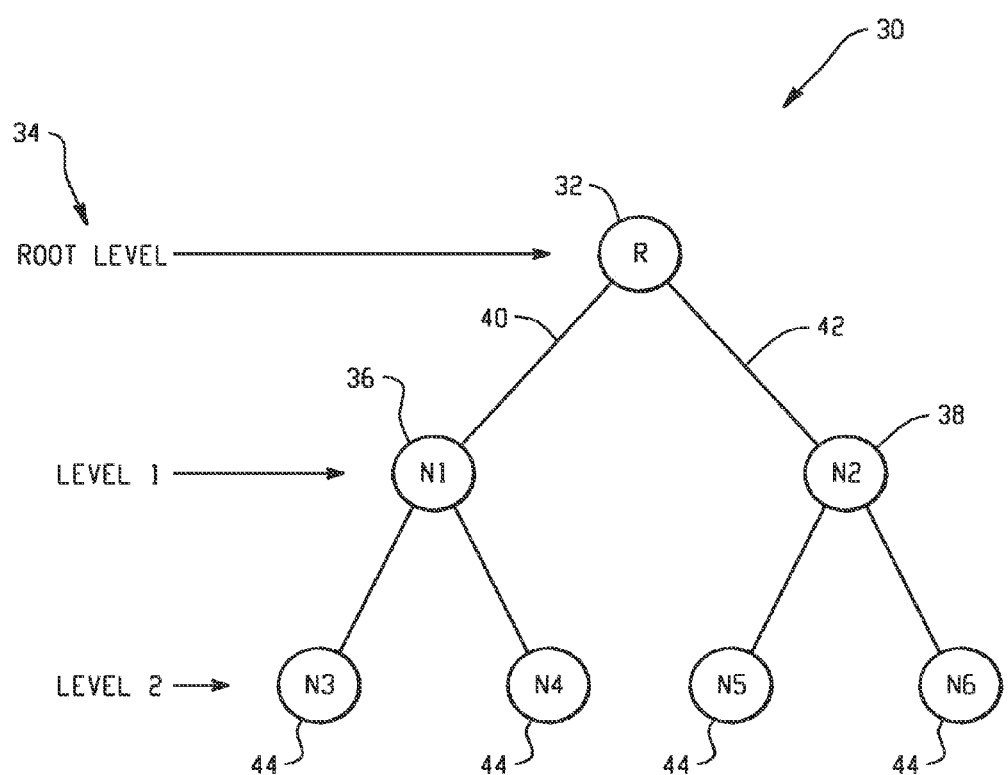
FIG. 1 illustrates an example hierarchical organization of data.
Figure 2:
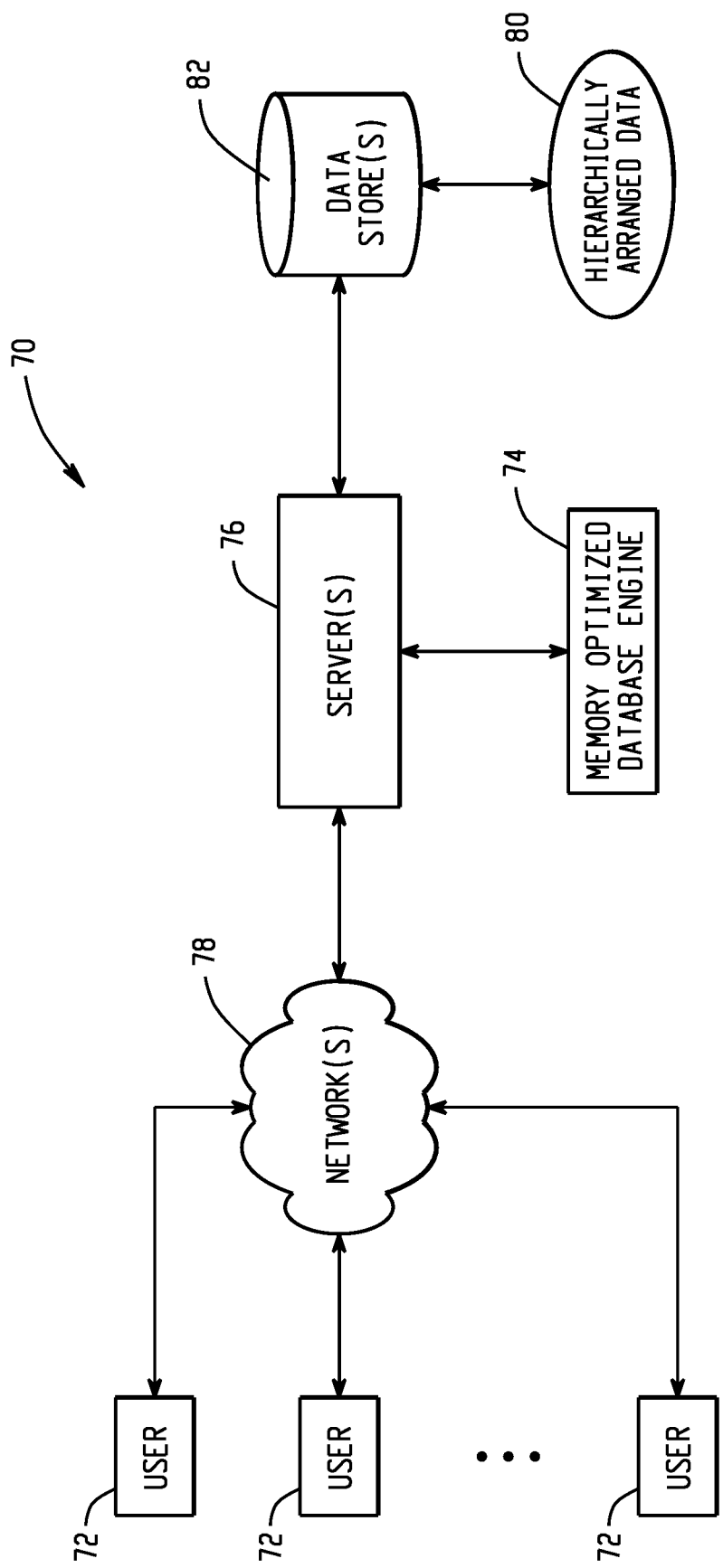
FIG. 2 is a block diagram depicting a computer-implemented environment for providing paginated search results from a multi-table database that stores hierarchically arranged data.

FIG. 2 depicts a computer-implemented environment for providing paginated search results from a multi-table database that stores hierarchically arranged data. FIG. 2 depicts at 70 an environment wherein users 72 can interact with a memory optimized database engine 74 hosted on one or more servers 76 through a network 78. The memory optimized database engine 74 may provide paginated search results from a multi-table database that stores hierarchically arranged data 80. The multi-table database containing hierarchically arranged data 80 may be stored in one or more data stores 82 responsive to the one or more servers 76.

Figure 3:
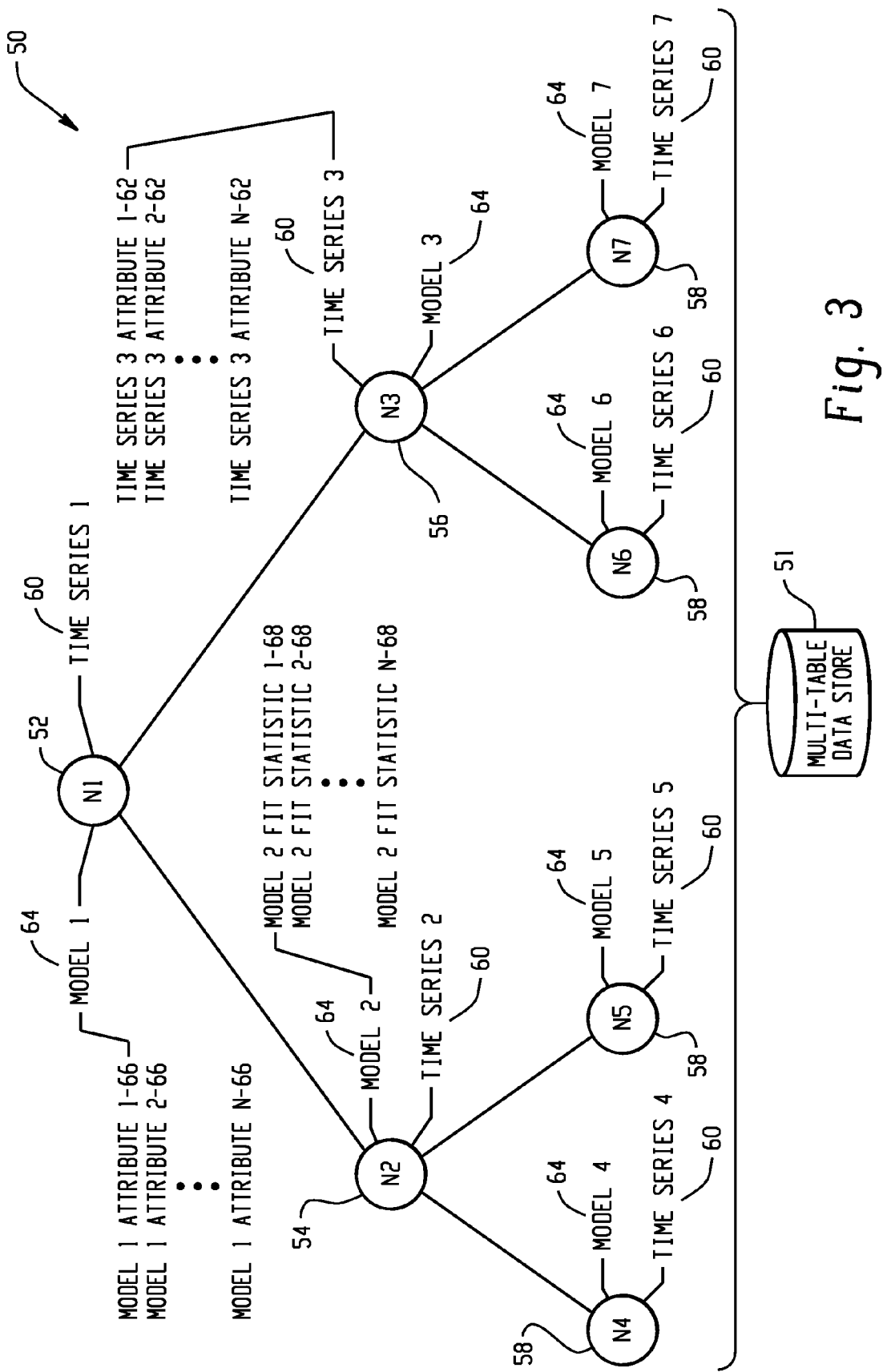
FIG. 3 illustrates an example hierarchical data organization having a time series and a statistical model associated with each node of the hierarchy.

FIG. 3 illustrates an example hierarchical data organization 50 having a time series and a statistical model associated with each node of the hierarchy that is stored in a multi-table data store 51. The hierarchy of FIG. 3 contains a single root node 52 at the root level. The root node 52 contains two children nodes 54, 56 at a first level, and each of the children nodes 54, 56 contains a plurality of children nodes 58 of their own at a second level. Each of the nodes of the example hierarchy 50 has a set of time series data 60 associated with the node. A time series is a sequence of data points, measured typically at successive times, that may be spaced at uniform time intervals. The time series data may represent a wide variety of information measured over time such as investment account value, inventory levels, reservoir water levels, etc. Each record in the time series 60 contains data regarding one or more time series attributes 62. For example, a time series containing data about a freshwater reservoir may contain attributes representing water level, water temperature, bacteria count, salinity, etc. at a given time. The time series data 60 may also contain summary statistics related to the time series data members such as mean, standard deviation, etc.

A statistical data model 64 is also associated with each node of the hierarchy 50. A statistical data model is a set of one or more mathematical equations which describe the behavior of an object of study in terms of random variables and their associated probability distributions. A statistical data model may be used to make estimations of unknowns or predictions of future events based on the time series data 60 associated with each node. For example, a statistical model associated with a node monitoring a water reservoir may predict the water temperature next week based on time series attribute data 62 related to past water temperature and water salinity. Each statistical data model 64 may have one or more model attributes 66 associated with the model 64 such as the type of model, the name of the model, inputs and outputs of the model, as well as estimations or predictions made by the data model 64 based on the time series data 60. Each node of the hierarchy 50 may contain one or more fit statistics 68 associated with the node. These fit statistics 68 may contain data related to the relationship between the data model 64 and the time series data 60 such as statistics of fit, mean absolute error, etc.

The construct depicted in FIG. 3 may be useful in a variety of applications where hierarchical time series forecasting creates various forecast summary data sets at all levels of a hierarchy. For large hierarchies, it may be difficult for a user to visualize and comprehend all of the statistics of all of the series at once. Thus, it may be desirable to enable a user to search the hierarchically stored series according to certain filtering criterion. It may also be beneficial to display the results of such searching in a desired sorted order. The user may further desire the ability to monitor certain attributes as the time series are updated, reforecasted, or modified in any other manner.

Figure 4:
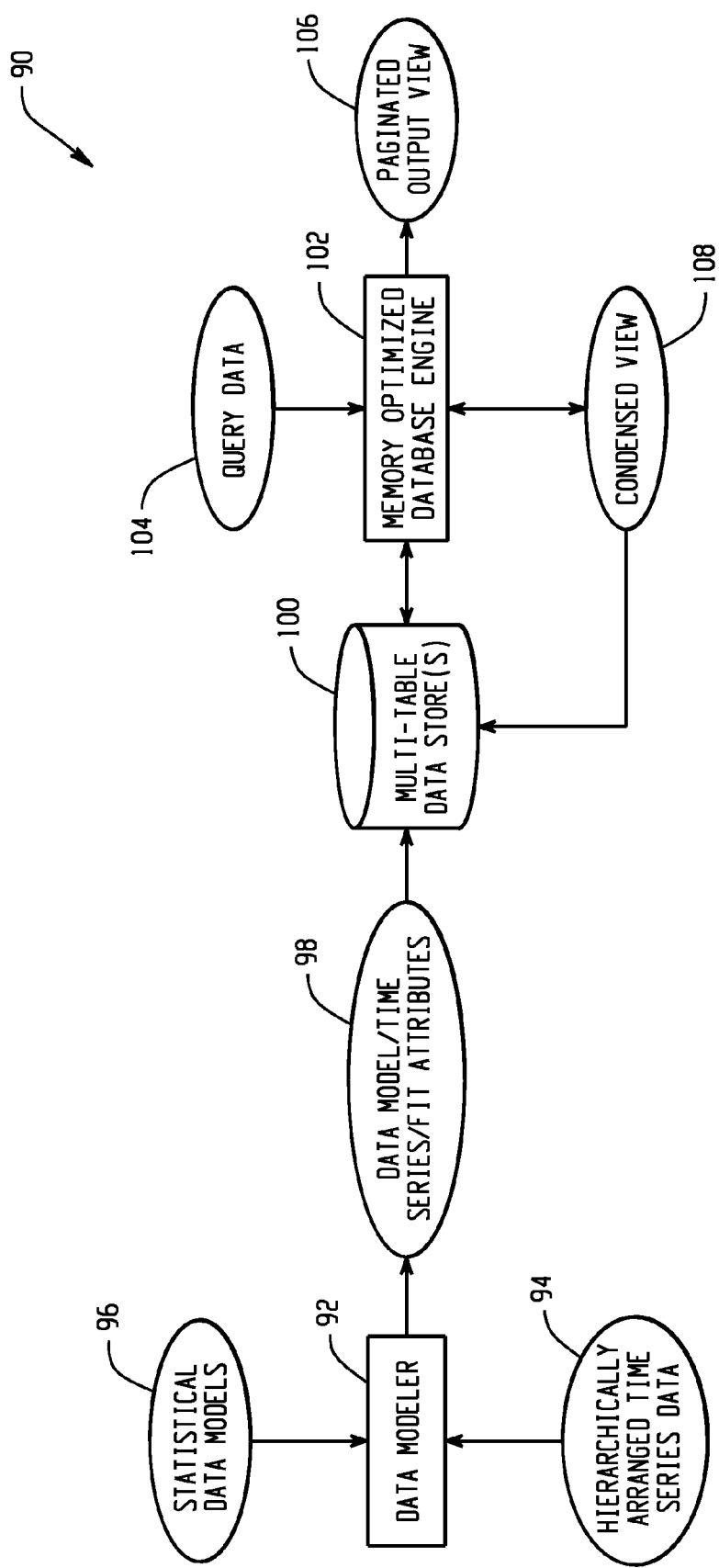
FIG. 4 is a block diagram depicting the incorporation of data into a multi-model data store and the extraction of paginated search results based on an input query.

FIG. 4 is a block diagram 90 depicting the incorporation of data into a multi-model data store and the extraction of paginated search results based on an input query. A data modeler 92 receives hierarchically arranged time series data 94 as well as a plurality of statistical data models 96 from which to choose. The data modeler 92 identifies a best statistical data model 96 for each time series and produces forecasts using that model. The forecasts may be generated independently for each time series 94, or the forecast may incorporate data or forecasts from other series of the hierarchy. Following hierarchical forecasting, each series may be characterized by various attributes such as summary statistics of the series, attributes of the model used for its forecasting, attributes of the forecasts generated by the model, attributes of any user-adjustments applied to the forecasts, etc. These data model/time series/fit attributes 98 are housed in one or more multi-table data stores 100 for subsequent access.

A memory optimized database engine 102 responsive to the one or more multi-table data stores 100 receives query data 104 entered by a user or another application. Query data may include filtering attributes, ordering attributes, and/or monitoring attributes. Filtering attributes are attributes used in determining records to be included in a results data set. Typically filtering attributes are included in a constraint, where a filtering attribute of a record must meet a certain criteria for a record to be included in a results data set. For example, a constraint, NAV>10, would include only records having a net asset value filtering attribute greater than the criteria, 10, in the results data set.

Ordering attributes are attributes used to define the order in which the filtered results should be displayed. These may or may not include some of the filtering attributes. For example, the ordering may be defined as 'Increasing in NAV and decreasing in Volatility.' In that case, NAV and Volatility are the ordering attributes. Monitoring attributes are attributes that are to be tracked or monitored. Monitoring attributes are not necessarily used for filtering or ordering purposes. For example, it may be desired to monitor the Investment_Name and Volatility attributes.

Upon receipt of query data 104, the memory optimized database engine 102 accesses the one or more multi-table data stores 100 to service the request. The memory optimized database engine 102 may produce a paginated output view 106 that displays requested monitoring attributes of records that are filtered according to the received constraints and ordered according to the desired ordering attributes as detailed in the query data 104. The memory optimized database engine 102 may also generate a condensed view 108 that may be stored in the multi-table data store 100 for later access. The condensed view contains sufficient data to quickly regenerate a paginated output view 106 without reexecution of time consuming filtering and ordering operations. Regeneration of the output view 106 using a condensed view 108 enables fast refreshing of desired monitoring attributes that includes updates to the monitoring attributes since creation of the condensed view 108.

Figure 5:
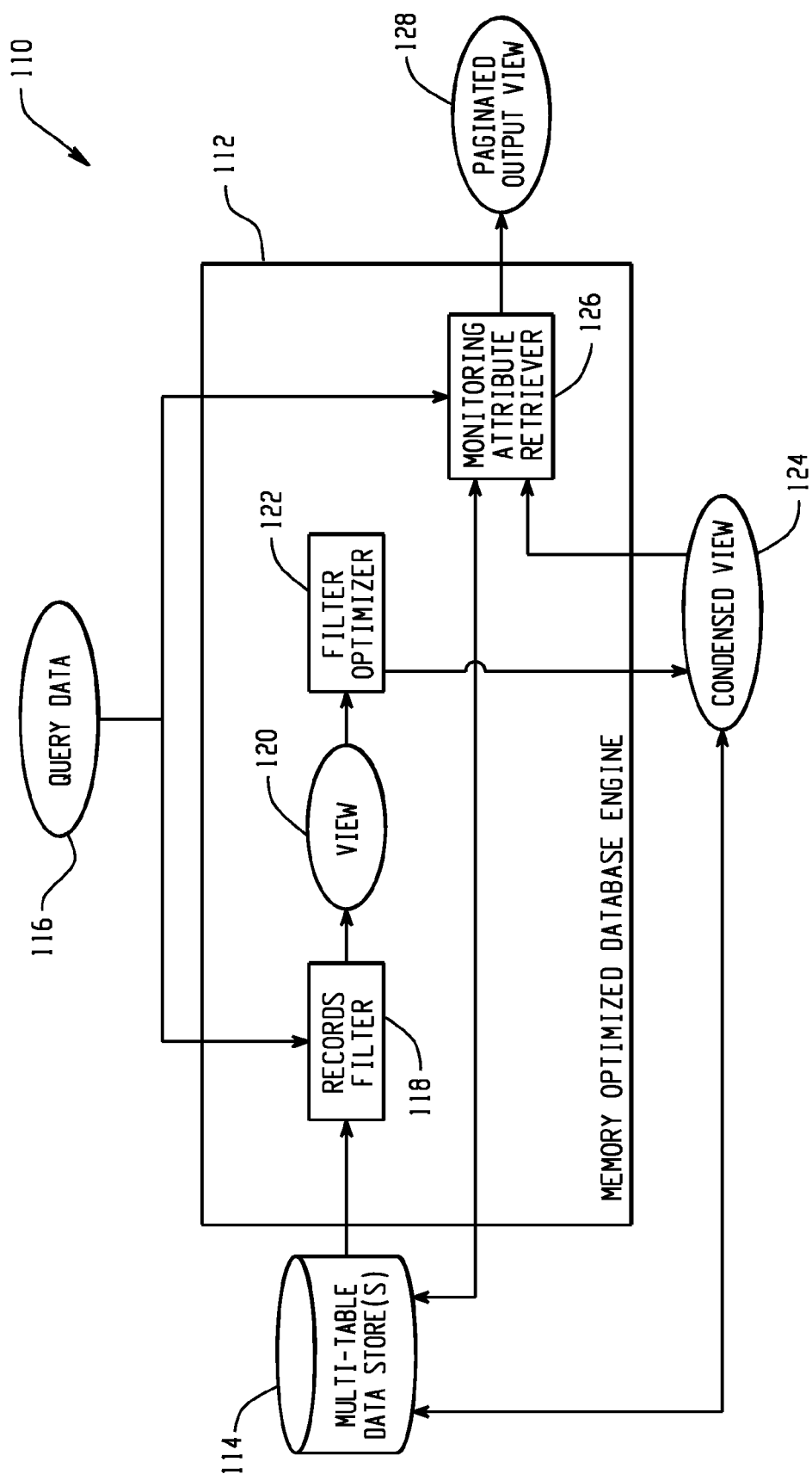
FIG. 5 is a block diagram depicting elements of an example memory optimized database engine.

FIG. 5 is a block diagram 110 depicting elements of an example memory optimized database engine 112. The memory optimized database engine 112 is responsive to a multi-table data store 114 that provides, for example, hierarchically arranged data. The memory optimized database engine 112 receives query data 116 that is provided to a records filter 118. The records filter 118 accesses the multi-table data store 114 and filters the data store according to constraints contained in the query data 116 to create a view 120. The view 120 is received by a filter optimizer 122. The filter optimizer 122 may remove one or more columns from the view 120 that are not needed to identify a record or a level on which a record resides in the hierarchically arranged multi-table database to generate a condensed view 124. The condensed view 124 may be provided to a monitoring attribute retriever 126, which accesses the monitoring attributes identified by the query data 116 from the multi-table data store 114 for the records identified in the condensed view 124. The monitoring attribute retriever 126 uses the retrieved data to generate a paginated output view 128, such as a chart or table on a computer monitor or other user-viewable medium. The condensed view 124 may also be transmitted to the multi-table data store 114 for storage. The condensed view 124 may be later retrieved from the multi-table data store 114 and provided to the monitoring attribute retriever 126 for efficient refreshing and redisplaying of the desired paginated output view 128.

Figure 6:
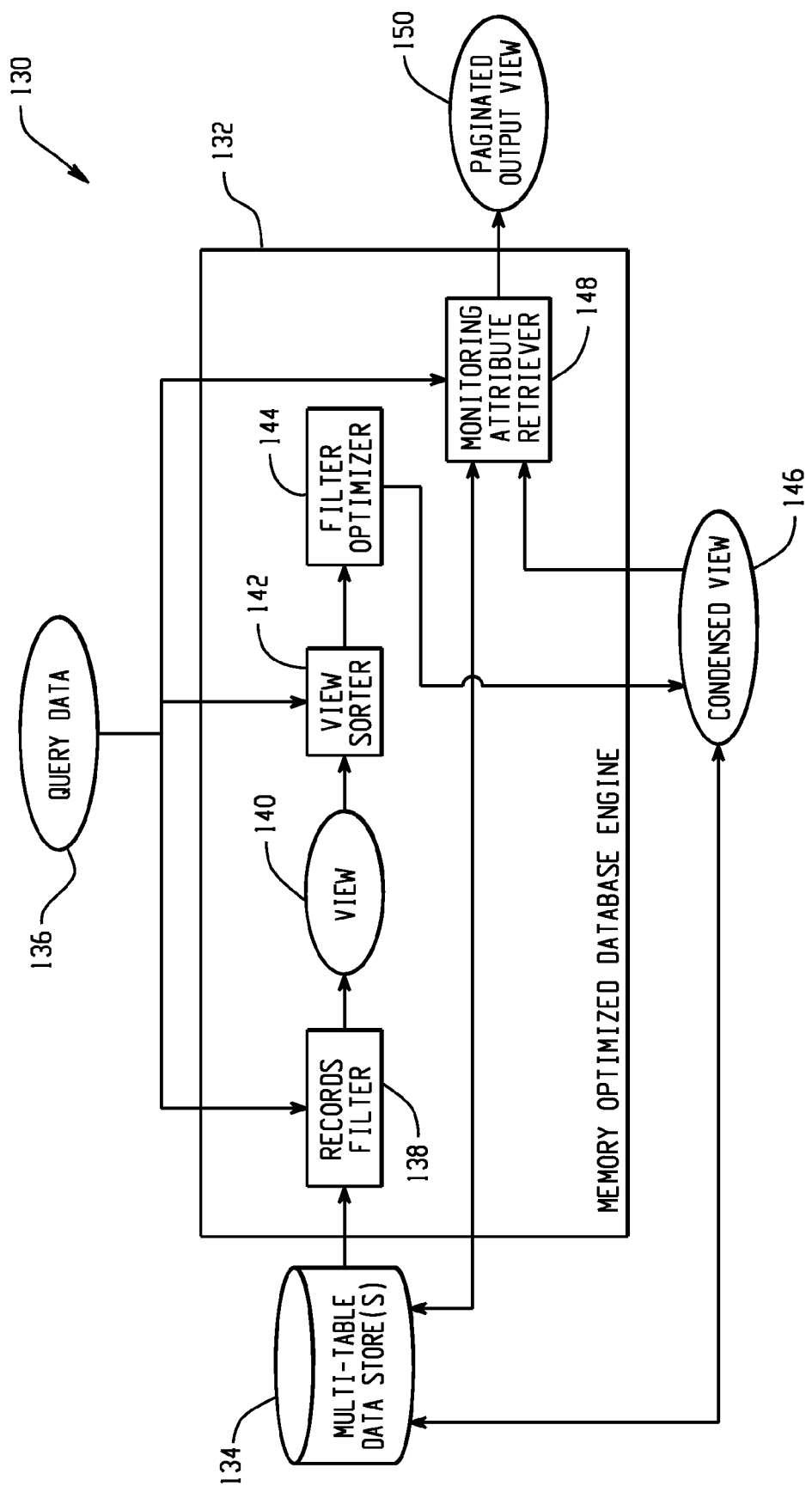
FIG. 6 is a block diagram depicting a second example configuration of a memory optimized database engine.

FIG. 6 is a block diagram 130 depicting a second example configuration of a memory optimized database engine 132. The memory optimized database engine 132 is responsive to a multi-table data store 134. The memory optimized database engine 132 receives query data 136 that is provided to a records filter 138. The records filter 138 accesses the multi-table data store 134 and filters the data store according to constraints contained in the query data 136 to create a view 140. The view 140 is received by a view sorter 142. The view sorter 142 orders the records contained in the view 140 as directed by the ordering attributes contained in the query data 136. The view sorter 142 propagates its results to a filter optimizer 144. The filter optimizer 144 may remove one or more columns that are not needed to identify a record or a level on which a record resides in the hierarchically arranged multi-table database to generate a condensed view 146. The condensed view 146 may be provided to a monitoring attribute retriever 148, which accesses the monitoring attributes identified by the query data 136 from the multi-table data store 134 for the records identified in the condensed view 146. The monitoring attribute retriever 148 uses the retrieved data to generate a paginated output view 150, such as a chart or table on a computer monitor or other user-viewable medium. The condensed view 146 may also be transmitted to the multi-table data store 134 for storage. The condensed view 146 may be later retrieved from the multi-table data store 134 and provided to the monitoring attribute retriever 148 for efficient refreshing and redisplaying of the desired paginated output view 150.

Figure 7:
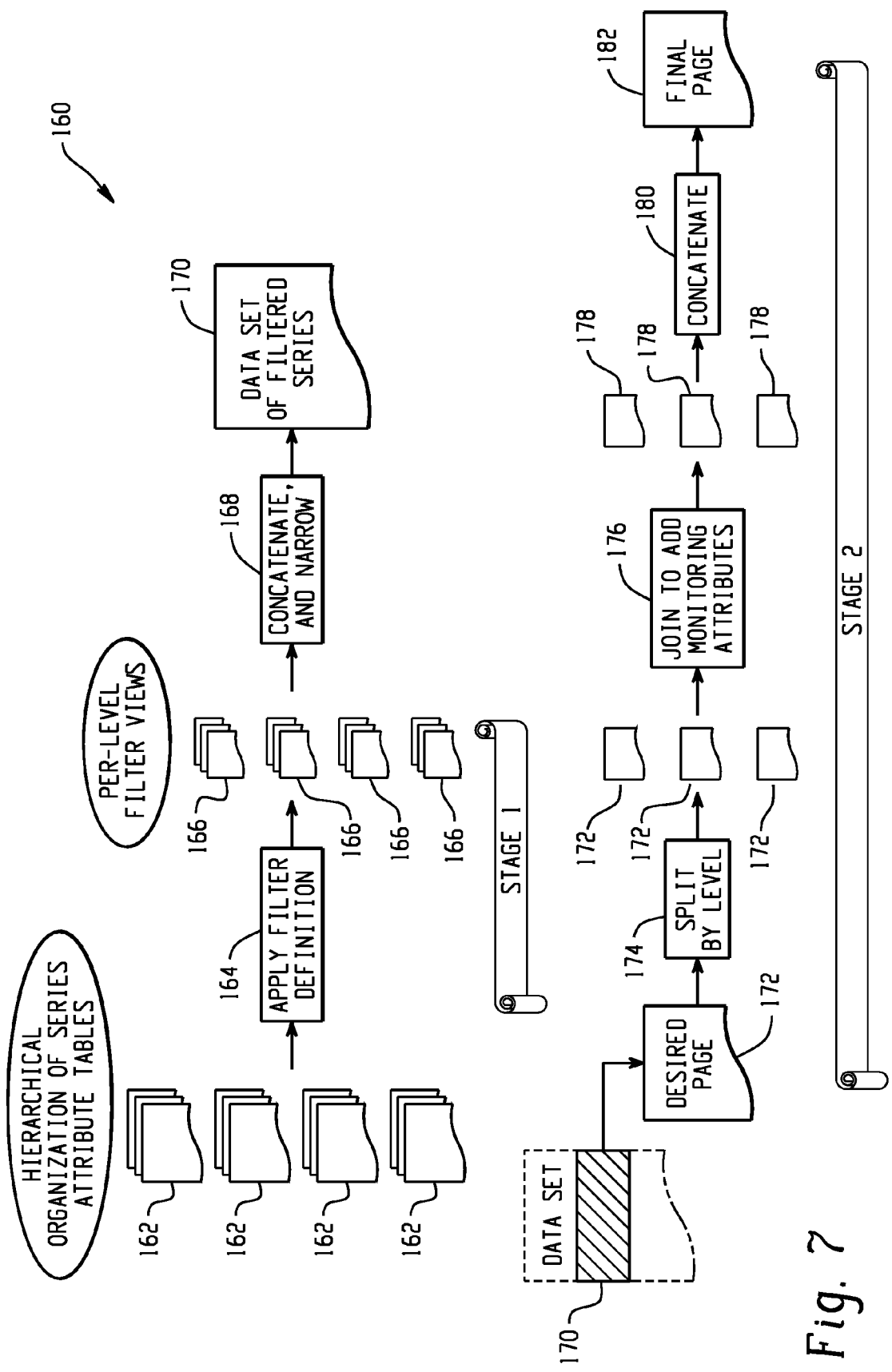
FIG. 7 is a flow diagram depicting an example process for providing paginated search results.

FIG. 7 is a flow diagram 160 depicting an example process for providing paginated search results. The process depicted in FIG. 7 exploits the fact that results will be browsed one page at a time, where the size of a page is proportional to how many rows may be displayed on the viewing device. This page size is independent of the number of rows satisfying the filter conditions. Performing operations on only a single page at a time enables some steps of the process to operate on small subsets of data, thereby increasing processing efficiency and reducing memory requirements. This may in turn allow the system to handle very large data sets in the multi-table data store in a scalable manner.

The example process of FIG. 7 operates in two stages. In the first stage, level-specific filter views are prepared from a hierarchical organization of series attribute tables 162. The series attribute tables 162 may be formed by joining multiple data tables to incorporate all of the filter attributes included in a desired query for each record. These joins may utilize the indices defined on series-identifier columns of the series attribute sets. For each level of the hierarchy, a filter 164 is applied to form a logical per-level filter view 166 containing the series that satisfies the filter criteria. If the filter definition involves only conjunction (AND) operations, the joining process may be made more efficient by applying one filter condition at a time. This cascading enables each subsequent join to work on a potentially smaller data set. If estimates of selectivity are available for each filter condition, then the condition with the least selectivity (e.g., the lowest percentage of series satisfying that particular condition) may be applied first, resulting in more efficient join operation. The per-level filter views 166 are then concatenated and may be narrowed to remove filter attributes and/or other columns that are not necessary to identify a record or the level of a record, as shown at 168, to generate a data set of filtered series 170.

In stage 2, upon a request to fetch a page of results, the corresponding subset of rows is retrieved from the data set 170 into a page data set 172. The page data set may then be split into-level specific data sets 172, as shown at 174, using a level-identifier column or other criteria. Each level-specific page data set may be joined with the appropriate attribute data sets from the level containing the requested monitoring attributes, as illustrated at 176, to generate expanded level-specific page data sets 178. These expanded level-specific page data sets are concatenated into one data set, as shown at 180, resulting in the final page data set 182 that may be sent back to the display client for user viewing or may be stored in a computer-readable data store.

Figure 8:
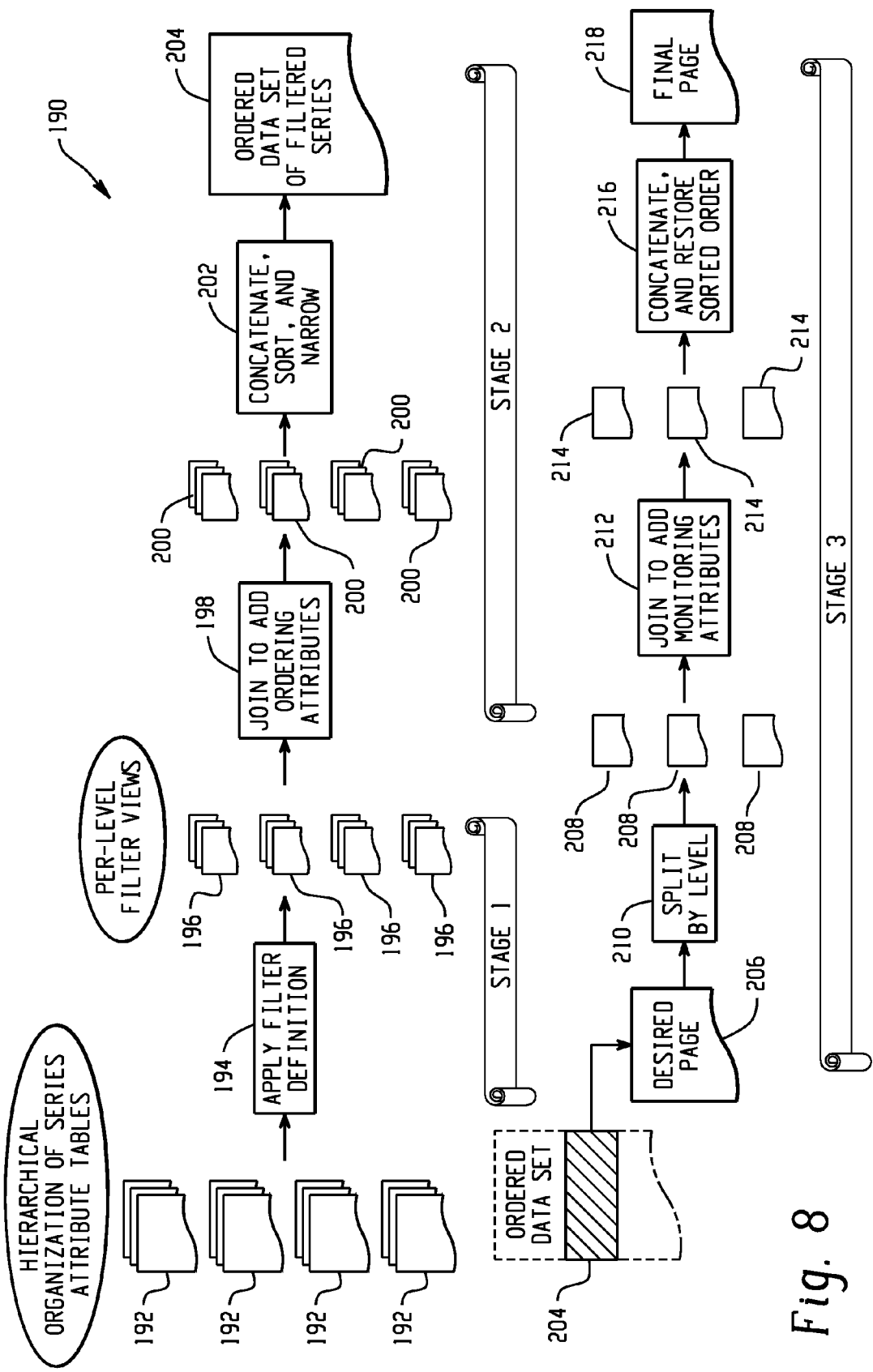
FIG. 8 is a flow diagram depicting an example process for providing ordered paginated search results.

FIG. 8 is a flow diagram 190 depicting an example process for providing ordered paginated search results that may be utilized when ordering attributes are included in the query data. The process of producing ordered paginated search results is a three stage process. In stage 1, level-specific filter views are prepared from a hierarchical organization of series attribute tables 192. The series attribute tables 192 may be formed by joining multiple data tables to incorporate all of the filter attributes included in a desired query for each record. These joins may utilize the indices defined on series-identifier columns of the series attribute sets. For each level of the hierarchy, a filter 194 is applied to form a logical per-level filter view 196 containing the series that satisfy the filter criteria. If the filter definition involves only conjunction (AND) operations, the joining process may be made more efficient by applying one filter condition at a time. This cascading enables each subsequent join to work on a potentially smaller data set.

In stage 2, joins necessary to incorporate ordering attributes into the records are performed as shown at 198. The per-level filter views with ordering attributes 200 are then concatenated and sorted according to the ordering attributes as instructed by the query data as shown at 202. The data set may be narrowed to remove filter attributes, ordering attributes, and/or other columns that are not necessary to identify a record or the level of a record to generate an ordered data set of filtered series 204.

In stage 3, upon a request to fetch a page of results, the corresponding subset of rows is retrieved from the ordered data set 204 into a page data set 206. An order-identifier column may be added to preserve ordering following splitting. The page data set may then be split into-level specific data sets 208, as shown at 210, using a level-identifier column or other criteria. Each level-specific page data set may be joined with the appropriate attribute data sets from the level containing the requested monitoring attributes, as illustrated at 212, to generate expanded level-specific page data sets 214. These expanded level-specific page data sets are concatenated into one data set and reordered according to the order-identifier column, as shown at 216, resulting in the final page data set 218 that may be sent back to the display client for user viewing or may be stored in a computer-readable data store.

The ability to store intermediate views increases flexibility and reusability of the memory optimized database engine. For example, retention of a condensed view enables easy refreshing of monitoring attribute values without rerunning filters or reordering records. Additionally, monitoring attributes may be added, subtracted, or changed and refreshed without rerunning filters or reordering through use of the condensed view. It should be noted that refreshing of monitoring attributes without rerunning filters or reordering may produce anomalous results if updated or new data violates one of the filtering constraints or would affect desired ordering.

Additionally, retention of a filtered but not ordered view would enable reordering of data records, perhaps necessitated by new time series data or new modeling predictions or necessitated by a desire to change ordering attributes, and updating of monitoring attribute values without requiring rerunning of the filtering stage. Refreshing monitoring attributes and/or refreshing monitoring views and reordering utilizing a condensed view or filtered view, respectively, may be performed at any time from immediately after initial processing to hours, days, weeks, months, years, etc. after initial processing is completed.

FIGS. 9-17 show examples utilizing a system described herein. FIG. 9 depicts at 220 attributes of a root level node and the time series and data model associated with the root level node. FIG. 9 depicts three root level tables. The Mprop table 222 stores attributes of the selected forecast model for the root level series, the Sprop table 224 stores summary statistics for the root level data series, and the Fprop table 226 stores statistics of the forecasts generated for the root level series. The Id columns 228 identify the series associated with each node.

FIG. 10 depicts at 230 attributes of level 1 nodes and the time series and data model associated with the level 1 nodes. FIG. 10 depicts three level 1 tables. The Mprop table 232 stores attributes of the selected forecast model for the two level 1 series N1, N2, the Sprop table 234 stores summary statistics for the two level 1 data series, and the Fprop table 236 stores statistics of the forecasts generated for the two level 1 series. The Id columns 238 identify the series associated with each node.

Figure 11:
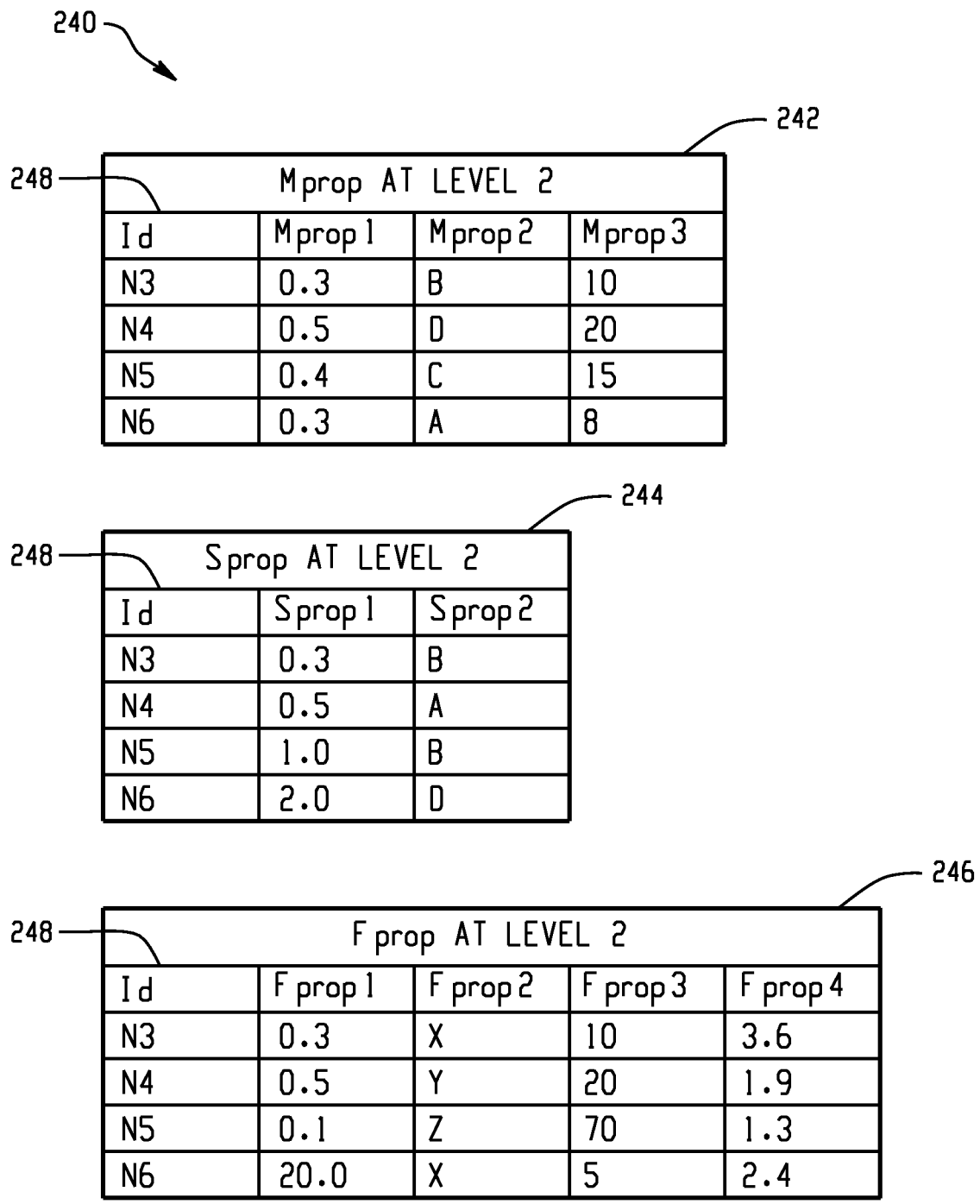
FIG. 11 depicts attributes of level 2 nodes and the time series and data model associated with the level 2 nodes.

FIG. 11 depicts at 240 attributes of level 2 nodes and the time series and data model associated with the level 2 nodes. FIG. 11 depicts three level 2 tables. The Mprop table 242 stores attributes of the selected forecast model for the four level 2 series N3, N4, N5, N6, the Sprop table 244 stores summary statistics for the four level 2 data series, and the Fprop table 246 stores statistics of the forecasts generated for the four level 2 series. The Id columns 248 identify the series associated with each node.

Following compilation and modeling to generate the data depicted in FIGS. 9-11, a query is received to access the data stored within the tables. The example query data for FIGS. 9-11 contains a Filter1 definition containing the constraint: Fprop4<=2.5 AND Sprop1<=1.0. Thus, Fprop4 and Sprop1 are filtering attributes. The query data further identifies Fprop3 as an ordering attribute, requiring that the records be sorted according to decreasing Fprop3. The query data further identifies Fprop3 and Mprop2 as the monitoring attributes.

Following receipt of the query data, logical views are prepared that yield the series satisfying the filtering definition at each level. To accomplish this, the Sprop table and the Fprop tables are joined at each level in order to compare both the Fprop4 and Sprop1 attributes for each record to the constraint criteria. Because the constraints are joined by an AND, a cascading technique may be utilized to further optimize execution. To accomplish this, rows are first selected from the Fprop table that satisfy the first condition, Fprop4<=2.5. The table resulting from this select, which is equal to or smaller in size than the Fprop table, is then joined with the Sprop table, and the records of the joined table are examined for compliance with the second condition, Sprop1<=1.0. FIG. 12 depicts at 250 filtered views at each of the levels, where tables 252, 254, 256 contain joined filtering attributes 258, 260 and a series identifier 262 for records which meet all of the constraints.

Alternatively, if it is known beforehand that the Sprop1 constraint has a lower selectivity than the Fprop4 constraint, then rows from the Sprop table may be selected based on the second constraint, the Fprop table may then be joined, and the joined table may be examined for compliance with the first constraint. As an additional alternative, if the constraints are not conjunctively joined or to provide more straightforward execution, the Fprop and Sprop tables may be joined in their entirety and then compared to the constraints.

Because the query data contains ordering attribute information, and the ordering attribute was not one of the filtering attributes, a further join is performed to incorporate the ordering attribute Fprop3 into the working views. Note that if processing efficiency was more critical than memory space efficiency, the Fprop3 column may have been incorporated into the working view during the processing described with respect to FIG. 12 because the ordering attribute, Fprop3, resides in the same table as one of the filtering attributes, the Fprop table. FIG. 13 depicts at 270 filtered views 272, 274, 276 at each of the levels with an ordering attribute 278 incorporated.

Following joining of the ordering attributes, the tables of FIG. 13 are concatenated, sorted according to the ordering attribute, and have a level indicator attribute incorporated as shown in the examples of FIGS. 14A and 14B. Following filtering and ordering, it may be desirable to store the filtered and ordered data set. FIG. 14A depicts at 280 a first example option for storage of the filtered, ordered data set where all of the filtering attributes 282 and ordering attributes 284 are stored along with the series identifier 286 and level indicator 288 attributes.

FIG. 14B depicts a second example option for storage of the filtered, ordered data set as a condensed view. The second option may be more desirable in scenarios where it is known that the final result page should not contain some or all of the filtering or ordering attributes, where one desires to refresh the data on the final result page dynamically without reapplying the filter definition and/or reordering the results, or where memory storage size constraints encourage storage optimization procedures. In the example of FIG. 14B, only the series identifier 290 and the level indicator 292 attributes are stored. Attributes required later, such as monitoring attributes, may be accessed at a later time when necessary for paginated view generation.

In this example, let the desired page be page 2 of the results, and let each page's size be set to 2. Let it also be assumed that the second option described with respect to FIG. 14B was chosen such that only the series identifier and level indicator attributes are retrained. The stage of generating the paginated search results begins by extracting the portion of the ordered data set that belongs to the desired page. In this case, page 2 is made up of the last two rows of the table depicted in FIG. 14B. These two rows 302, as shown in FIG. 15A at 300, are accessed and an order indication column 304 is appended identifying the order of the results records. The portion of the ordered data set for page 2 depicted in FIG. 15A may then be split according to the level indicator attribute 306 to generate the portion of page 2 for the root level view 308 and the portion of page 2 for level 2 view 310 shown in FIG. 15B.

For each level specific portion view of page 2, the necessary joins are performed to incorporate the monitoring attributes, Fprop3 and Mprop2. The level indicator attribute is used to help locate the proper tables depicted in FIGS. 9-11 to join. The monitoring attributes are joined to generate the portion of page 2 for the root level with monitoring levels incorporated view 322 and the portion of page 2 for level 2 with monitoring levels incorporated view 324 shown in FIG. 16A at 320. The two portion views 322, 324 may then be concatenated and the level indicator attribute may be removed, as it is no longer needed. This concatenation and simplification results in the portion of the ordered data set for page 2 with monitoring attributes incorporated view depicted in FIG. 16B at 326. This view is reordered according to the order indication column and the order indication column may then be removed to generate the output view 330 depicted in FIG. 17. This output view 330 may then be depicted on a user-readable medium such as a computer monitor, a paper printout, etc. Alternatively, or in addition, the output view 330 may be stored in a computer-readable memory for later access.

FIG. 18 is a flow diagram depicting at 340 a method of providing paginated search results from a multi-table database that stores hierarchically arranged data nodes, where a time series is associated with each node, where a statistical model is associated with each time series, wherein one or more attributes of each statistical model are stored in the multi-table database. A query request is received that identifies one or more constraints and one or more monitoring attributes, as shown at 342, where a constraint includes a filtering attribute and a criteria that the filtering attribute must meet for a record to be included in the search results, where the filtering attribute is a stored attribute of a statistical model or a stored attribute of a time series. At 344, records of the multi-table database are filtered to create a view containing only records which meet all of the constraints. One or more columns are removed from the view that are not needed to identify a record or a level on which a record resides in the hierarchically arranged multi-table database to generate a condensed view, as shown at 346. Monitoring attributes are accessed at 348 that are associated with a first n records of the condensed view to generate an output view, where n is the number of records that may be displayed on a single page. At 350, the output view is displayed on a user-viewable medium.

FIG. 19 is a flow diagram depicting at 360 a method of providing ordered paginated search results from a hierarchically arranged multi-table database. A query request is received at 362 that identifies one or more constraints, one or more ordering attributes, and one or more monitoring attributes. The records of the multi-table database are filtered at 364 to create a view containing only records which meet all of the constraints. At 366, the view is sorted according to the one or more ordering attributes. A level indicator column may be incorporated into the view, and all columns may be removed from the view except a record identifying column and a level indicator column. This condensed view may be stored in non-volatile memory. Upon request to generate an output view for the first n records, a portion of the stored condensed view corresponding to those records may be extracted into a page view, an order indicator column may be incorporated into that page view, and the page view may be split into level tables according to the level indicator column as shown at 368. Monitoring attributes are accessed for each of the level tables at 370 and the updated level tables are concatenated and reordered according to the order indicator column to generate an output view. The output view is displayed on a user-viewable medium at 372.

Figure 20:
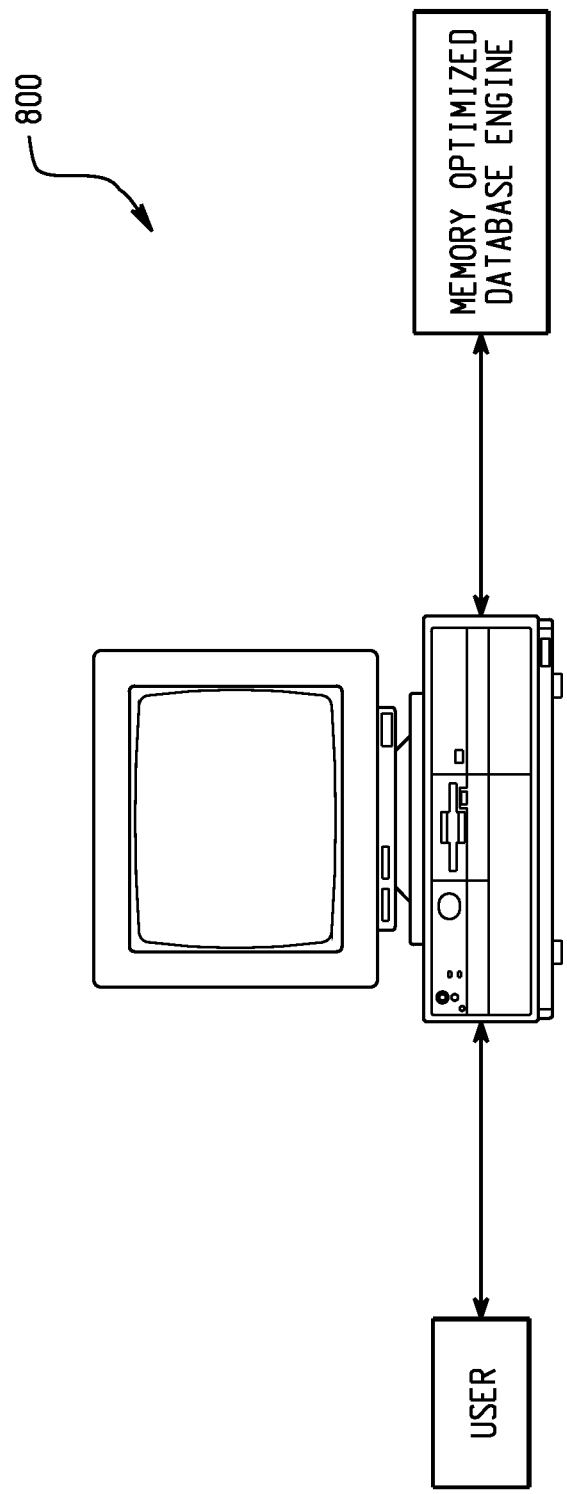
FIG. 20 is a block diagram depicting an environment wherein a user can interact with a memory optimized database engine.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 800 on FIG. 20), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for providing query results, comprising:
   receiving a query for data stored in a hierarchical data store, wherein the query includes filtering criteria, wherein the hierarchical data store includes a plurality of levels, wherein a level includes one or more tables, and wherein a table stores one or more records;
   generating, using one or more data processors, a level view for each of the levels in the plurality of levels, wherein generating a level view includes using the filtering criteria to filter one or more records stored in one or more tables in each level, and wherein the plurality of level views include level attributes;
   generating, using the one or more data processors, a concatenated view, wherein generating includes combining the plurality of level views, and wherein the concatenated view includes a plurality of concatenated view records;
   narrowing, using the one or more data processors, the concatenated view by removing one or more of the level attributes, wherein removing the one or more level attributes includes determining whether a level attribute is needed to identify a concatenated view record or whether a level attribute is needed to identify a level on which a concatenated view record resides in the hierarchical data store;
   storing the narrowed concatenated view;
   receiving a request for query results corresponding to the query;
   generating, using the one or more data processors, an output view that includes one or more concatenated view records from the narrowed concatenated view, wherein generating the output view includes incorporating one or more monitoring attributes into the output view using a join operation; and
   providing the output view for display.

2. The method of claim 1, wherein the request for query results is a request for a display of a page of n concatenated view records.

3. The method of claim 2, wherein generating the output view incorporates monitoring attributes for a first n concatenated view records.

4. The method of claim 3, further comprising:
   receiving a request to view a next page of n concatenated view records;
   generating a revised output view that includes a second n concatenated view records, wherein generating the revised output view includes incorporating the monitoring attributes for the second n concatenated view records; and
   displaying the revised output view containing the second n records on a display.

5. The method of claim 1, wherein filtering the one or more records includes joining a table that is referenced in the filtering criteria.

6. The method of claim 1, wherein additional requests for query results are received after the concatenated view is stored.

7. The method of claim 1, wherein one of the level views includes a level view monitoring attribute value, wherein the output view includes a corresponding output view monitoring attribute value, and wherein the level view monitoring attribute value differs from the corresponding output view monitoring attribute value.

8. The method of claim 1, wherein the stored concatenated view contains only a record identification column and a level identification column.

9. The method of claim 1, wherein the concatenated view is stored in a non-volatile memory.

10. The method of claim 1, wherein the one or more records are filtered using a cascading filtering technique.

11. The method of claim 10, wherein filtering includes using the cascading filtering technique to determine a first constraint and a second constraint of the filter criteria, wherein the first constraint is applied before the second constraint, and wherein the first constraint excludes more records than the second constraint.

12. The method of claim 1, wherein generating the output view includes incorporating an ordering attribute into the output view and sorting the output view according to the ordering attribute.

13. The method of claim 1, wherein the request for query results includes a request to display a page of n concatenated view records, and wherein when fewer than n concatenated view records are contained in the concatenated view, then fewer than n concatenated view records are included in the output view.

14. A system for providing query results, comprising:
one or more processors;
a computer-readable storage medium containing instructions configured to cause the one or more processors to perform operations, including:
   receiving a query for data stored in a hierarchical data store, wherein the query includes filtering criteria, wherein the hierarchical data store includes a plurality of levels, wherein a level includes one or more tables, and wherein a table stores one or more records;
   generating a level view for each of the levels in the plurality of levels, wherein generating a level view includes using the filtering criteria to filter one or more records stored in one or more tables in each level, and wherein the plurality of level views include level attributes;
   generating a concatenated view, wherein generating includes combining the plurality of level views, and wherein the concatenated view includes a plurality of concatenated view records;
   narrowing the concatenated view by removing one or more of the level attributes, wherein removing the one or more level attributes includes determining whether a level attribute is needed to identify a concatenated view record or whether a level attribute is needed to identify a level on which a concatenated view record resides in the hierarchical data store;
   storing the narrowed concatenated view;
   receiving a request for query results corresponding to the query;
   generating an output view that includes one or more concatenated view records from the narrowed concatenated view, wherein generating the output view includes incorporating one or more monitoring attributes into the output view using a join operation; and
   providing the output view for display.

15. A computer-program product, tangibly embodied in a non-transitory machine-readable storage medium, including instructions configured to cause a data processing apparatus to:
   receive a query for data stored in a hierarchical data store, wherein the query includes filtering criteria, wherein the hierarchical data store includes a plurality of levels, wherein a level includes one or more tables, and wherein a table stores one or more records;
   generate a level view for each of the levels in the plurality of levels, wherein generating a level view includes using the filtering criteria to filter one or more records stored in one or more tables in each level, and wherein the plurality of level views include level attributes;
   generate a concatenated view, wherein generating includes combining the plurality of level views, and wherein the concatenated view includes a plurality of concatenated view records;
   narrow the concatenated view by removing one or more of the level attributes, wherein removing the one or more level attributes includes determining whether a level attribute is needed to identify a concatenated view record or whether a level attribute is needed to identify a level on which a concatenated view record resides in the hierarchical data store;
   store the narrowed concatenated view;
   receive a request for query results corresponding to the query;
   generate an output view that includes one or more concatenated view records from the narrowed concatenated view, wherein generating the output view includes incorporating one or more monitoring attributes into the output view using a join operation; and
   provide the output view for display.

16. The system of claim 14, wherein the request for query results is a request for a display of a page of n concatenated view records.

17. The system of claim 16, wherein generating the output view incorporates monitoring attributes for a first n concatenated view records.

18. The system of claim 17, further comprising instructions configured to cause the one or more processors to perform operations including:
   receiving a request to view a next page of n concatenated view records;
   generating a revised output view that includes a second n concatenated view records, wherein generating the revised output view includes incorporating the monitoring attributes for the second n concatenated view records; and
   displaying the revised output view containing the second n records on a display.

19. The system of claim 14, wherein filtering the one or more records includes joining a table that is referenced in the filtering criteria.

20. The system of claim 14, wherein additional requests for query results are received after the concatenated view is stored.

21. The system of claim 14, wherein one of the level views includes a level view monitoring attribute value, wherein the output view includes a corresponding output view monitoring attribute value, and wherein the level view monitoring attribute value differs from the corresponding output view monitoring attribute value.

22. The system of claim 14, wherein the stored concatenated view contains only a record identification column and a level identification column.

23. The system of claim 14, wherein the concatenated view is stored in a non-volatile memory.

24. The system of claim 14, wherein the one or more records are filtered using a cascading filtering technique.

25. The system of claim 24, wherein filtering includes using the cascading filtering technique to determine a first constraint and a second constraint of the filter criteria, wherein the first constraint is applied before the second constraint, and wherein the first constraint excludes more records than the second constraint.

26. The system of claim 14, wherein generating the output view includes incorporating an ordering attribute into the output view and sorting the output view according to the ordering attribute.

27. The system of claim 14, wherein the request for query results includes a request to display a page of n concatenated view records, and wherein when fewer than n concatenated view records are contained in the concatenated view, then fewer than n concatenated view records are included in the output view.

28. The computer-program product of claim 15, wherein the request for query results is a request for a display of a page of n concatenated view records.

29. The computer-program product of claim 28, wherein generating the output view incorporates monitoring attributes for a first n concatenated view records.

30. The computer-program product of claim 29, further comprising instructions configured to cause a data processing apparatus to:

receive a request to view a next page of n concatenated view records;

generate a revised output view that includes a second n concatenated view records, wherein generating the revised output view includes incorporating the monitoring attributes for the second n concatenated view records; and display the revised output view containing the second n records on a display.

31. The computer-program product of claim 15, wherein filtering the one or more records includes joining a table that is referenced in the filtering criteria.

32. The computer-program product of claim 15, wherein additional requests for query results are received after the concatenated view is stored.

33. The computer-program product of claim 15, wherein one of the level views includes a level view monitoring attribute value, wherein the output view includes a corresponding output view monitoring attribute value, and wherein the level view monitoring attribute value differs from the corresponding output view monitoring attribute value.

34. The computer-program product of claim 15, wherein the stored concatenated view contains only a record identification column and a level identification column.

35. The computer-program product of claim 15, wherein the concatenated view is stored in a non-volatile memory.

36. The computer-program product of claim 15, wherein the one or more records are filtered using a cascading filtering technique.

37. The computer-program product of claim 36, wherein filtering includes using the cascading filtering technique to determine a first constraint and a second constraint of the filter criteria, wherein the first constraint is applied before the second constraint, and wherein the first constraint excludes more records than the second constraint.

38. The computer-program product of claim 15, wherein generating the output view includes incorporating an ordering attribute into the output view and sorting the output view according to the ordering attribute.

39. The computer-program product of claim 15, wherein the request for query results includes a request to display a page of n concatenated view records, and wherein when fewer than n concatenated view records are contained in the concatenated view, then fewer than n concatenated view records are included in the output view.

* * * * *